US006961477B2

(12) United States Patent
Martinez-Uriegas et al.

(10) Patent No.: US 6,961,477 B2
(45) Date of Patent: Nov. 1, 2005

(54) IMAGE-BASED SELECTION OF GAMUT MAPPING

(75) Inventors: Eugenio Martinez-Uriegas, Mountain View, CA (US); Thomas Schumacher, Cuptertino, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 09/902,593

(22) Filed: Jul. 12, 2001

(65) Prior Publication Data

US 2003/0012427 A1 Jan. 16, 2003

(51) Int. Cl.$^7$ .............................. G06K 9/20; G06F 13/00
(52) U.S. Cl. ........................................ 382/283; 345/590
(58) Field of Search .............................. 382/162, 165, 382/166, 232, 240, 250, 280, 298, 299, 173, 282, 283; 345/589, 604, 619, 622, 624, 626, 628, 590; 358/1.9, 501, 515, 518, 523, 530

(56) References Cited

U.S. PATENT DOCUMENTS

| | | | | |
|---|---|---|---|---|
| 5,450,216 | A | 9/1995 | Kasson | 358/518 |
| 5,539,540 | A | 7/1996 | Spaulding et al. | 358/518 |
| 5,598,482 | A | 1/1997 | Balasubramanian | 382/199 |
| 5,731,818 | A | 3/1998 | Wan et al. | 345/431 |
| 5,748,342 | A | 5/1998 | Usami | 358/590 |
| 5,801,854 | A | 9/1998 | Naylor, Jr. | 358/518 |
| 5,907,415 | A | 5/1999 | Yabe | 358/518 |
| 6,104,829 | A | 8/2000 | Nakajima | 382/167 |
| 6,198,843 | B1 * | 3/2001 | Nakauchi et al. | 382/167 |
| 6,226,011 | B1 | 5/2001 | Sakuyama et al. | 345/431 |
| 6,414,690 | B1 * | 7/2002 | Balasubramanian et al. | 345/589 |
| 6,516,089 | B1 * | 2/2003 | McCann et al. | 382/166 |
| 6,633,668 | B1 * | 10/2003 | Newman | 382/166 |
| 6,646,762 | B1 * | 11/2003 | Balasubramanian et al. | 358/1.9 |
| 6,719,392 | B2 * | 4/2004 | Qiao | 347/15 |
| 6,720,973 | B2 * | 4/2004 | Butler | 345/604 |
| 2002/0031257 | A1 | 3/2002 | Kato | 382/165 |

FOREIGN PATENT DOCUMENTS

EP     1098511     9/2001    ............ H04N/1/60

OTHER PUBLICATIONS

Fairchild, M.D., *Color Appearance Models*, Chapter 17, pp. 338–366, Addison Wesley,© 1998.
Wyszecki, G., et al., *Color Science*, Chapter 3, pp. 117–248, Wiley © 1982.
Mallat, S., *A Wavelet Tour of Signal Processing*, Academic Press, © 1998.
Meyer, Y., *Wavelets: Algorithms and Applications*, Siam, © 1993.
Burt, P.J., "The pyramid as a structure for efficient computation", *Multiresolution Image processing and Analysis*, pp. 6–35, 1984.

(Continued)

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

Gamut mapping of an original image using one or more of plural different gamut mapping algorithms. The original image is subjected to spatial frequency analysis so as to determine spatial frequency content thereof, and different regions of the original image are gamut mapped using different ones of the plural gamut mapping algorithms based on the spatial frequency analysis. Because the gamut mapping algorithm for any one regions is selected based on spatial frequency content of the region, the gamut mapping algorithm is tailored more specifically to image content of the region, yielding gamut-mapped images with higher perceived color fidelity and colorfulness.

26 Claims, 9 Drawing Sheets

OTHER PUBLICATIONS

Mitchel, J.L., et al. "Evolving JPEG color data compression standards", *Electronic Imaging Systems; Critical Reviews of Optical Science and Technology*, vol. CR37, pp. 68–97, SPIE Press 1991.

Christopoulous, C. "Coding of Still Pictures—JPEG 2000 Verification Model 7.0", ISO/IEC JTC 1/SC 29/WG 1 WG1N1684, Apr. 25, 2000.

Balasubramanian, R., et al., "Gamut Mapping to Preserve Spatial Luminance Variations" *IS&T/SIDEighth Color Imaging Conference*, pp. 122–128, Nov. 7–10, 2000.

H. Kotera, et al., "Object to Object Color Matchings By Image Clustering", IS&Ts NIP 14:1998 International Conference on Digital Printing Technologies, pp. 310–314.

* cited by examiner

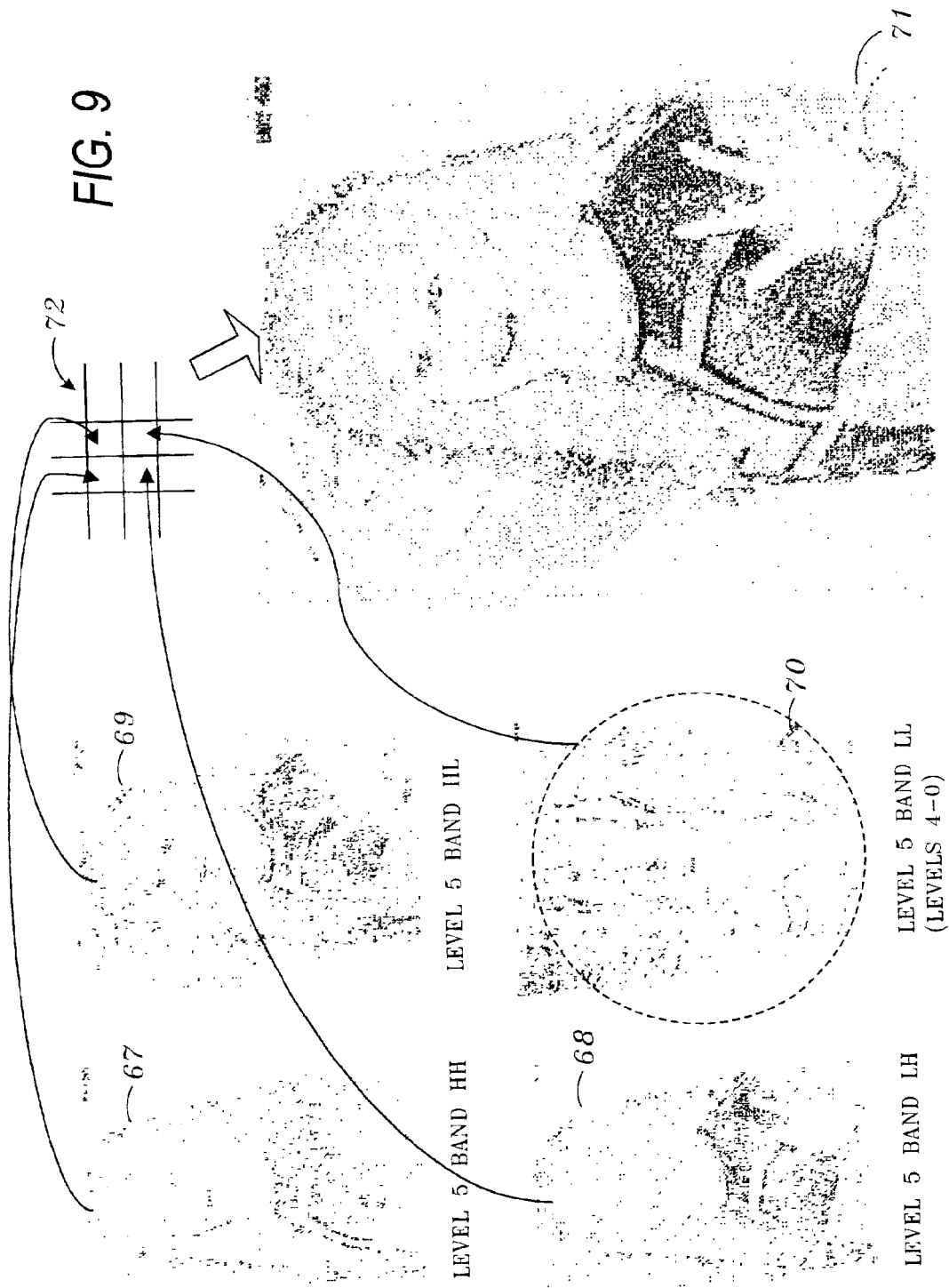

IMAGE-BASED SELECTION OF GAMUT MAPPING

BACKGROUND OF THE INVENTION

1. Field of the Invention

The present invention relates to gamut mapping of colors in a color image, and in particular relates to selection of different gamut mappings for different regions of an image based on a spatial frequency analysis of the image.

2. Description of the Related Art

Gamut mapping is a well-known procedure by which colors in a color image that are not reproducible by an output device are mapped to reproducible colors, while preserving the perception of good color fidelity and colorfulness.

Many different gamut mapping algorithms have been proposed, and it is known that some types of color images are gamut-mapped better with some gamut mapping algorithms than others. For example, it is known that computer graphic images having only a few highly saturated colors, such as might be found in a presentation, are gamut mapped more accurately by preserving saturation rather than by preserving hue. On the other hand, for natural scene photographic images, better gamut-mapped results are obtained by preserving hue and hue gradation. It has therefore been considered to analyze an image as a whole, or analyze each region in an image, so as to identify images or regions thereof for which different gamut mapping algorithms should be applied based on content.

It has heretofore been difficult, however, to identify content of an image or regions thereof, so as to select an appropriate gamut mapping algorithm. In particular, classification of objects in an image, or classification of the image itself, often depends on artificial and/or empirical rules which through trial and error have been found to work on some images, but which do not work on all.

SUMMARY OF THE INVENTION

It is therefore an object of the invention to address the foregoing, by applying different gamut mapping algorithms to different regions of an original image based on spatial frequency content of the original image.

Thus, in one aspect, the invention is gamut mapping of an original image by one or more of plural different gamut mapping algorithms, in which spatial frequency content of the original image is analyzed, regions of the original image are associated with one of the plural gamut mapping algorithms based on the spatial frequency analysis, and each region associated with a gamut mapping algorithm is gamut mapped using the associated gamut mapping algorithm so as to produce a gamut mapped image of the original image. In preferred embodiments, regions of the image are associated with one of the plural gamut mapping algorithms by segregating the image into busy regions and smooth regions based on the spatial frequency analysis. Gamut mapping proceeds by a first gamut mapping algorithm (such as a clipping algorithm) for smooth regions, and by a second gamut mapping algorithm (such as a compression algorithm) for busy regions. In many embodiments, one or more spatial frequency mask may be constructed, which mask regions for gamut mapping by the first algorithm and regions for gamut mapping by the second algorithm.

Spatial frequency analysis may proceed by known or hereafter developed analysis tools such as discrete cosine transform, discrete Fourier transform, or discrete wavelet transform. Regions of the original image are associated with one of the plural gamut mapping algorithms based on coefficients from such transforms. In addition, the original image may be transformed into a color space more suitable for gamut mapping analysis, such as a perceptual color space like CIEL*a*b* space or a viewing condition independent color space like Jch color space (as defined in CIECAM97s).

Because different gamut mapping algorithms are associated with different regions of the original based on spatial frequency analysis of the content of the original image, it is possible to select gamut mapping algorithms that are more accurately tuned to specific spatial frequency content of the original. Thus, better gamut mapping results, inasmuch as spatial frequency analysis is defined more concretely in mathematics, and is less dependent on artificial rules of object classification as in the prior art. In particular, because regions are defined by spatial frequency analysis, as are the masks constructed therefrom, the regions need not follow any preconceived notions of objects in an image, or of their boundaries. For example, prior art image classifiers might successfully identify the image of a person in a natural scene photographic image, and segregate the person's image as a separate object. The invention, on the other hand, might identify several different regions in the person's image, such as hair (which is textured), face (which is smooth), clothing, etc., with different gamut mapping algorithms being applied against different regions.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 9 is a view for explaining construction of a spatial mask.

Figure 5:
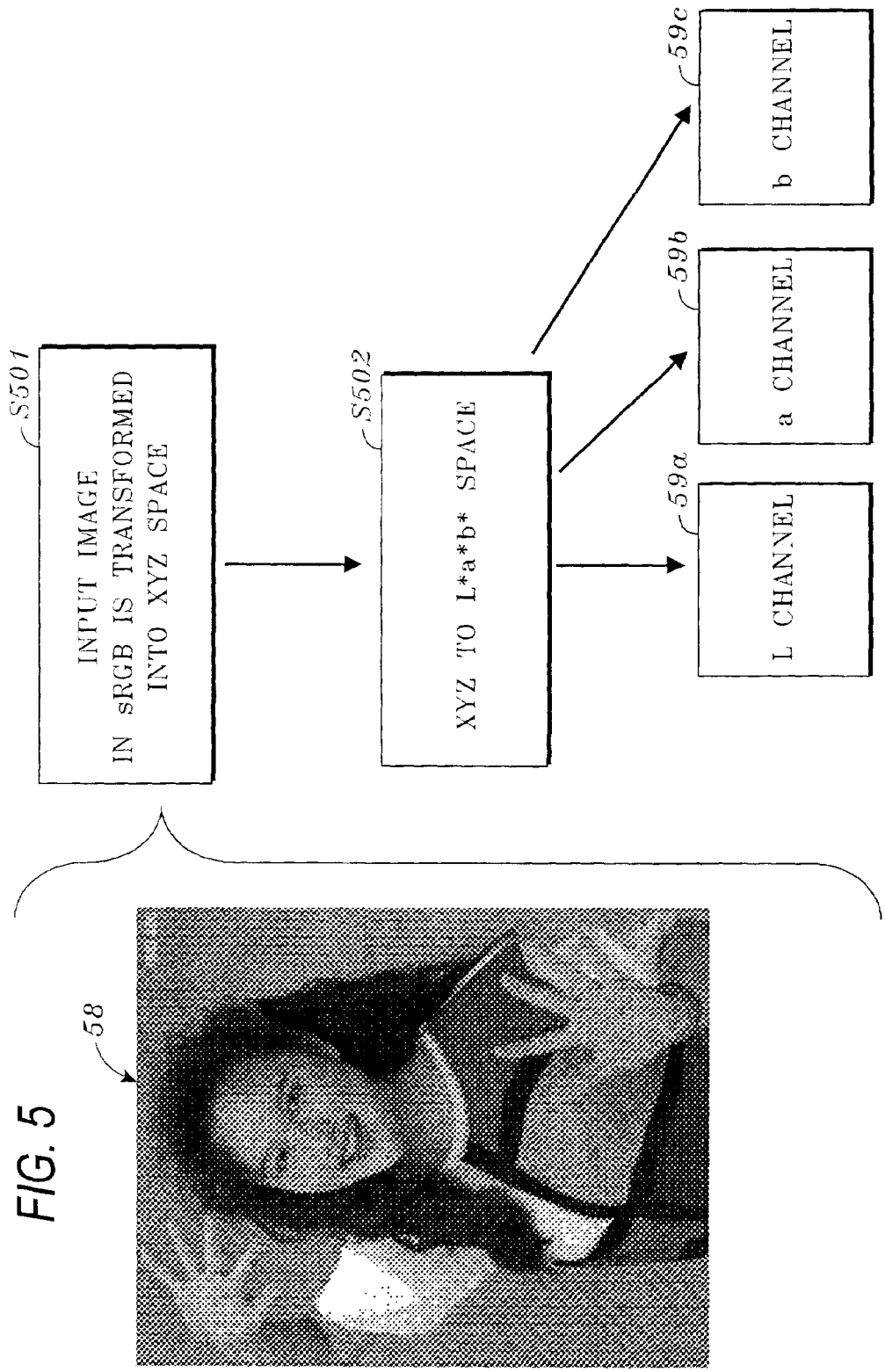
FIG. 5 is a view for explaining color space transformation.
Figure 8:
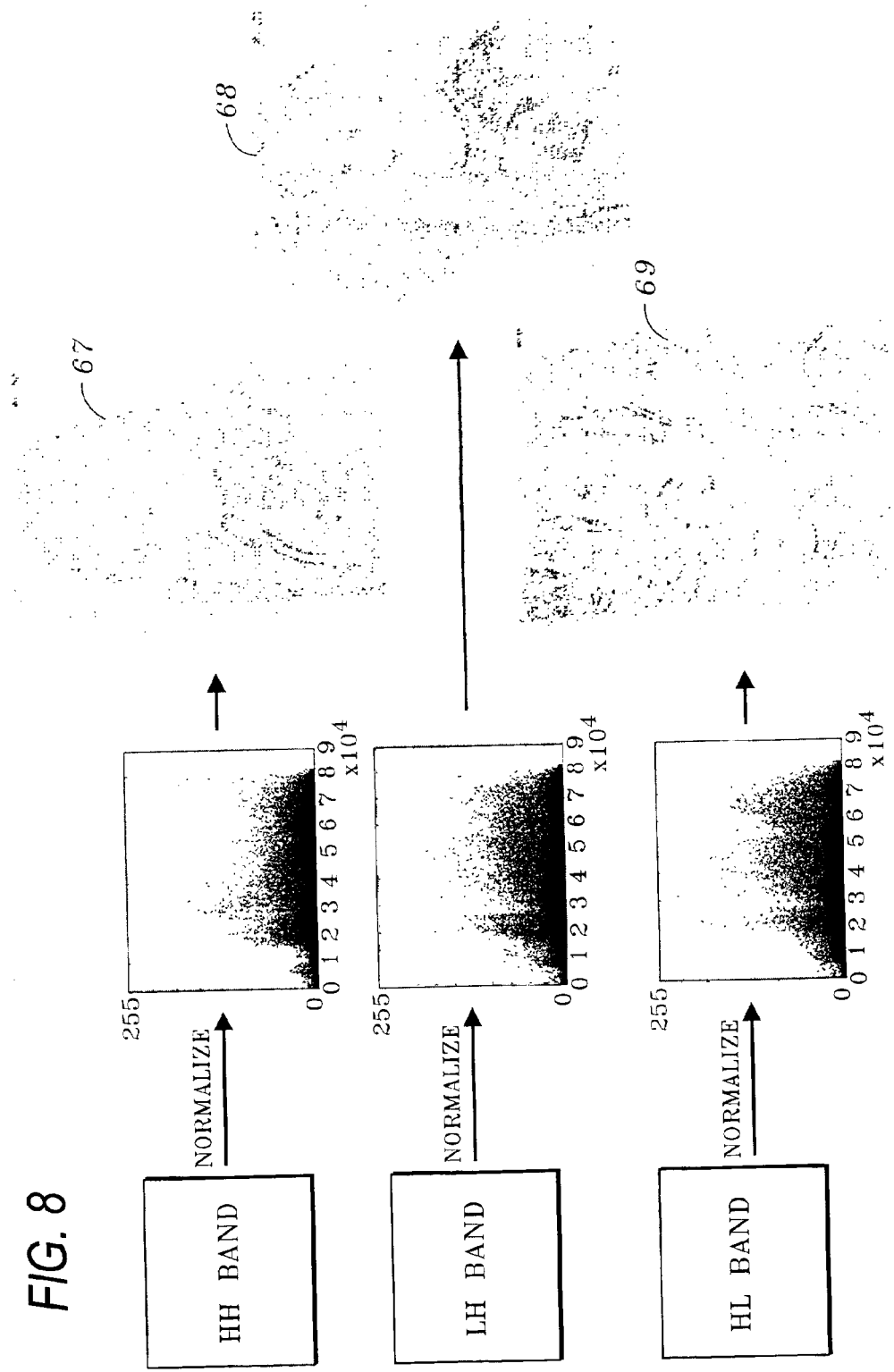

To conform with formal requirements for patent drawings, FIGS. 5, 8 and 9 have been reproduced with halftone dots even though they are intended to represent fully grayscale images.

DETAILED DESCRIPTION OF THE PREFERRED EMBODIMENT

Figure 1:
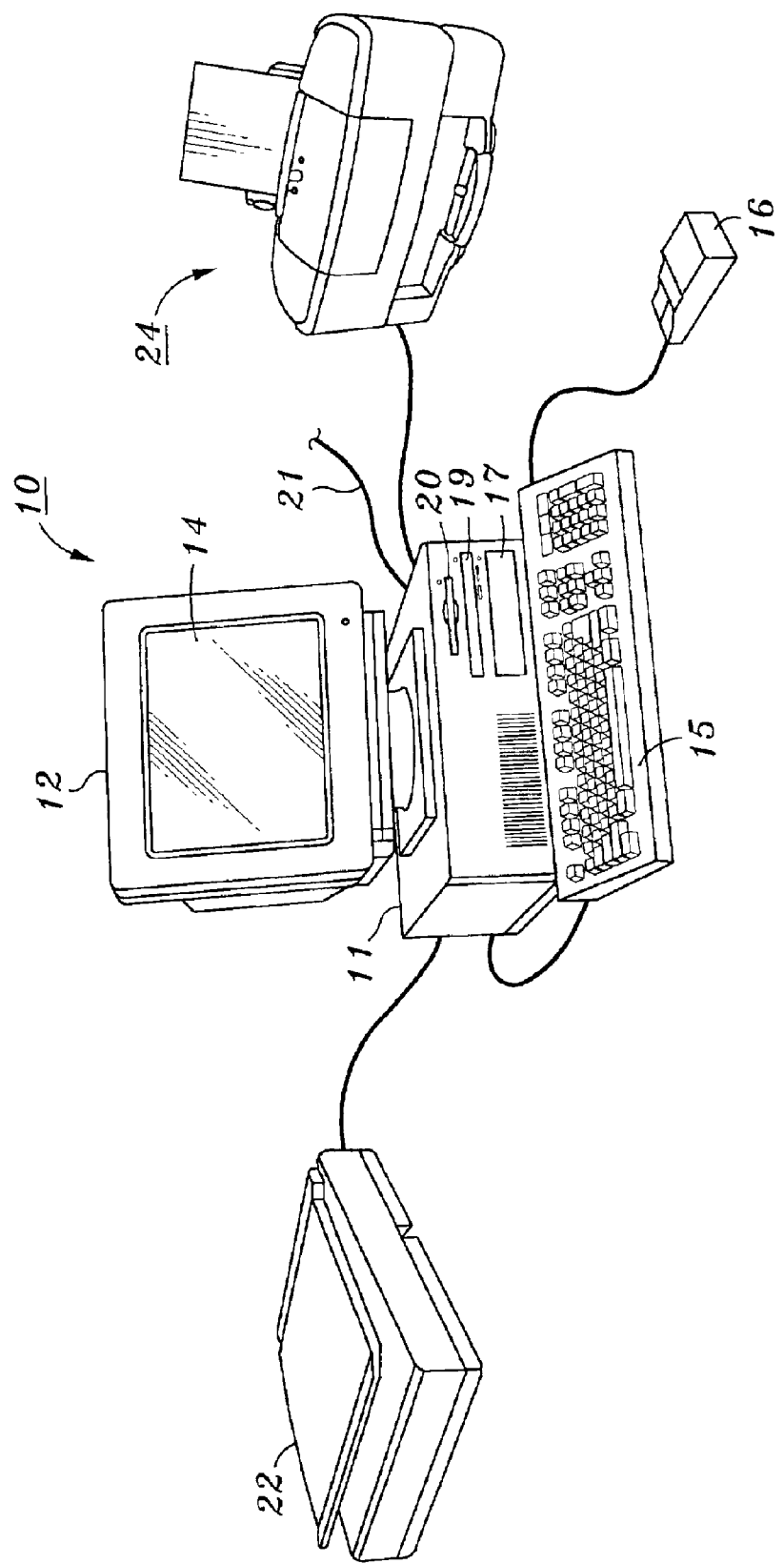
FIG. 1 is a view illustrating the outward appearance of computing equipment embodying the present invention.

FIG. 1 is a view showing the outward appearance of representative computing equipment 10 which includes image-based gamut mapping according to the invention. Computing equipment 10 includes host processor 11 which comprises a personal computer (hereinafter "PC") preferably having a windowing operating system such as Microsoft Windows, Xwindows or MacIntosh operating systems. Provided with computing equipment 10 are color monitor 12 including display screen 14, keyboard 15 for entering text data and user commands, and pointing device 16. Pointing device 16 preferably comprises a mouse, for pointing, selecting and manipulating objects displayed on display screen 14.

Computing equipment 10 includes a computer-readable memory medium such as a fixed disk 17 and/or floppy disk drive 19 and/or CDROM drive 20. Such computer readable memory media allow computing equipment 10 to access information such as image data, computer executable process steps, application programs, and the like, stored on removable and non-removable memory media. In addition, network access 21 allows computing equipment 10 to acquire information, images and application programs from other sources, such as a local area network or the internet, or from digital cameras or digital video cameras.

Scanner 22 scans original images such as original color photographs or color documents to provide image information to computing equipment 10. Printer 24 is a color output device such as an ink jet printer or a color laser beam printer.

Figure 2:
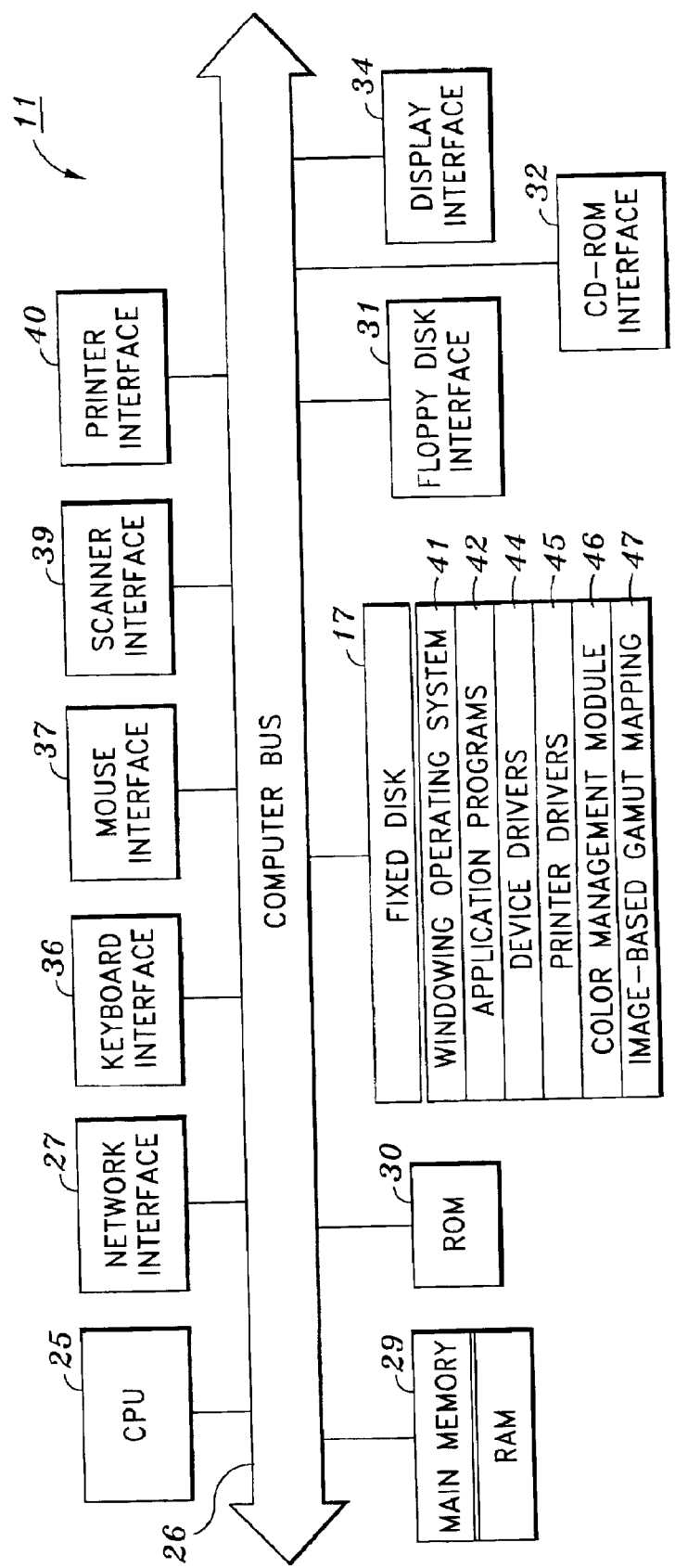
FIG. 2 is a detailed block diagram of the computing equipment shown in FIG. 1.

FIG. 2 is a detailed block diagram showing the internal architecture of PC 11. As shown in FIG. 2, PC 11 includes central processing unit ("CPU") 25 that interfaces with computer bus 26. Also interfacing with computer bus 26 are fixed disk 17, network interface 27 for network access 21, random access memory ("RAM") 29 for use as main memory, read only memory ("ROM") 30, floppy disk interface 31, CDROM interface 32, display interface 34 to monitor 12, keyboard interface 36 to keyboard 15, mouse interface 37 to pointing device 16, scanner interface 39 to scanner 22, and printer interface 40 to printer 24.

Main memory 29 interfaces with computer bus 26 so as to provide RAM storage to CPU 25 during execution of software programs such as the operating system, application programs, and device drivers. More specifically, CPU 25 loads computer-executable process steps from disk 17 or other memory media into a region of main memory 29, and thereafter executes the stored process steps from main memory 29 in order to execute software programs. Data such as color images can be stored in main memory 29, where the data can be accessed by CPU 25 during execution.

As also shown in FIG. 2, fixed disk 17 contains a window operating system 41, application programs 42 such as application programs that manipulate, obtain and print color images, device drivers 44 such as printer driver 45, and a color management module 46 which includes image-based gamut mapping according to the invention.

Image-based gamut mapping according to the invention is preferably implemented according to a color management module such as that shown at 46. Color management module 46 may be implemented as a stand-alone software application program, but more preferably is implemented as part of an output device driver such as printer driver 45. It is also possible to implement a color management module which includes image-based gamut mapping according to the invention, as a dynamic link library ("DLL"), or as a plug-in to other application programs such as image manipulation programs like Adobe Photoshop.

Figure 3:
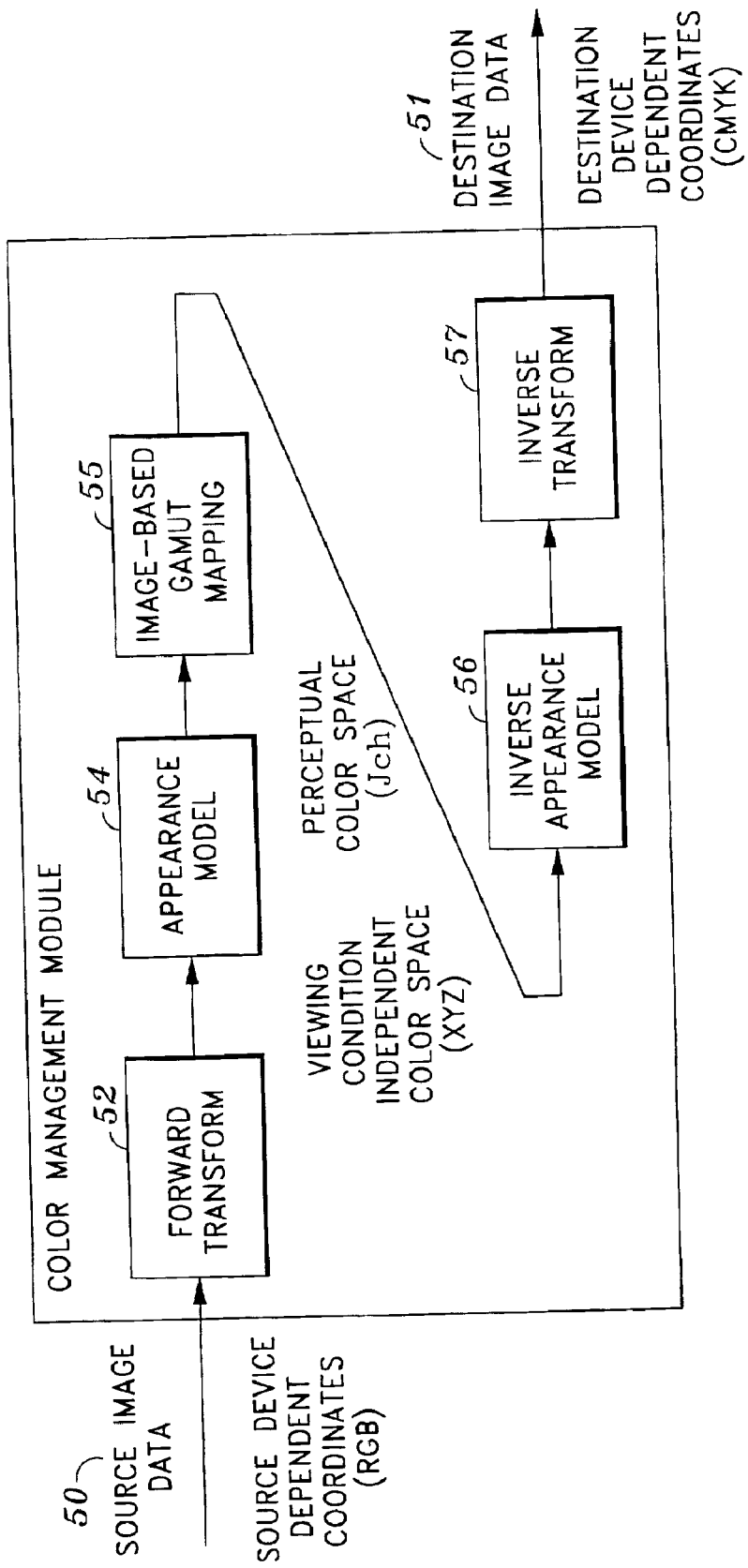
FIG. 3 is a functional block diagram showing a color management module implementing image-based selection of gamut mapping according to the invention.

FIG. 3 is a block diagram showing a preferred implementation of image-based gamut mapping embodied in color management module 46. As shown in FIG. 3, source image data is provided to color management module 46 which processes the source image data 50 so as to generate destination image data 51. The source image data 50 is image data in device dependent coordinates, such as RGB image data from scanner 22. Destination image data 51 is image data in destination device coordinates, such as CMYK coordinates for printer 24. Internally of color management module 46, source image data 50 is transformed with the source device transform at forward transform 52, so as to yield image data in a viewing condition independent color space, such as CIEXYZ or CIEL*a*b* space. The transformed image data is converted with an appearance model 54 so as to obtain image data in a perceptual color space such as Jch color space, or other profile connection space. While in the perceptual color space, the image data is subjected to gamut mapping, and in particular is subjected to image-based gamut mapping according to the invention at 55. Thereafter, the gamut-mapped image data is converted through inverse appearance model 56 so as to yield image data in a viewing condition independent color space, and thereafter is transformed with an inverse device transform 57 for the destination device, so as to yield image data in destination device coordinates.

Figure 4:
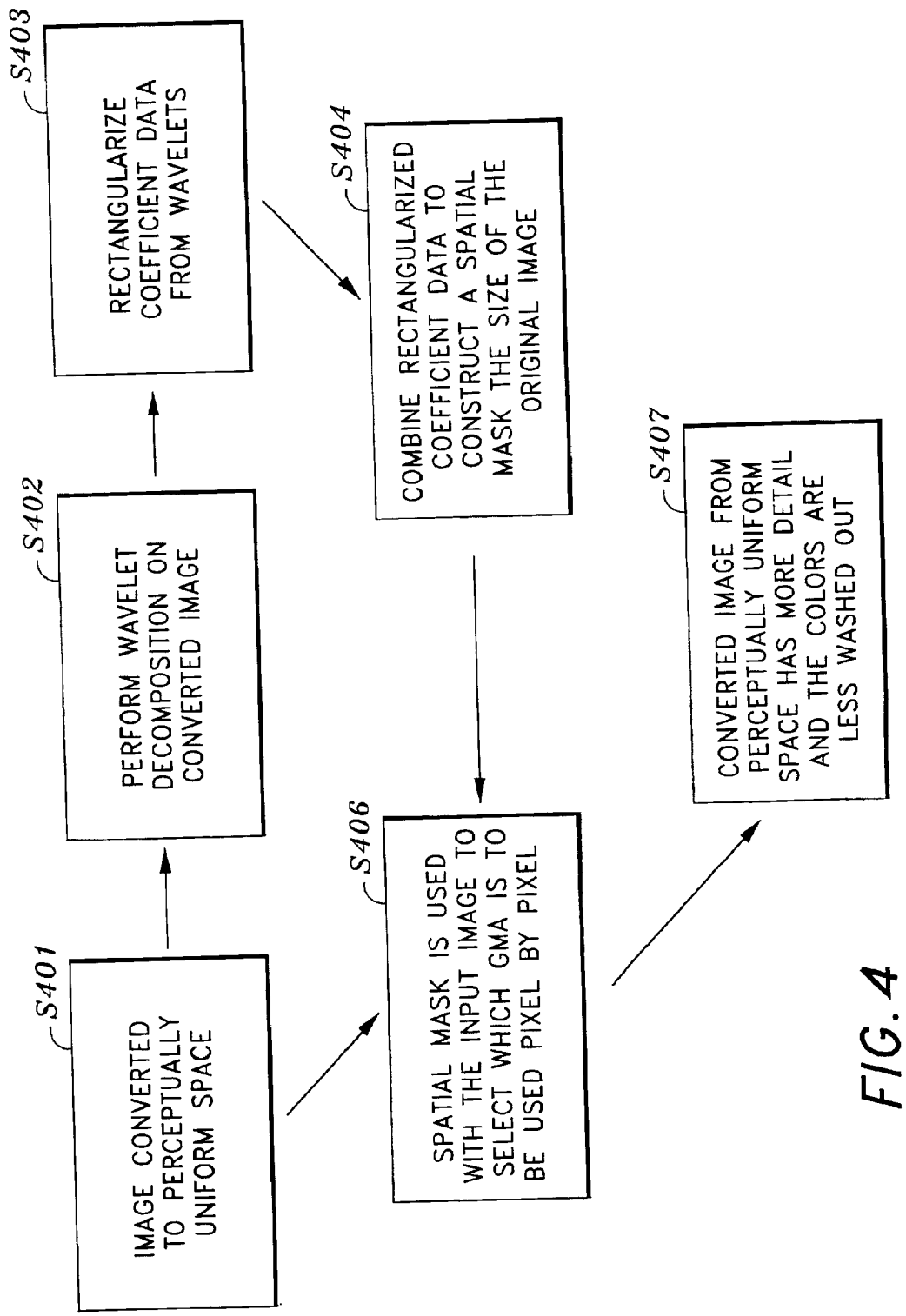
FIG. 4 is a detailed flow diagram for explaining the invention.

FIG. 4 is a detailed flow diagram for explaining gamut mapping according to the invention. Briefly, the process steps shown in FIG. 4 operate to analyze spatial frequency content of the original image, to associate regions of the original image with one of plural gamut mapping algorithms based on the analysis of spatial frequency content, and to gamut-map each region associated with a gamut mapping algorithm using the associated gamut mapping algorithm so as to produce a gamut-mapped image of the original image. In addition, the process steps shown in FIG. 4 illustrate construction of a spatial mask which, based on a threshold test for values in the spatial mask, masks regions of the original image for gamut mapping by a first gamut mapping algorithm and regions of the original image for gamut mapping by a second gamut mapping algorithm.

In more detail, step S401 converts the original image to a perceptually uniform space if such a conversion is needed. In particular, although the illustrated embodiment shows image based gamut mapping 55 in the context of a color management module 46, it is possible to implement the invention as stand-alone gamut mapping. In such circumstances, it is preferred to transform the input image into a perceptually uniform color space. Jch color space is preferred, but other color spaces such as CIEL*a*b* space are acceptable.

FIG. 5 is a view for explaining the conversion of step S401. As shown in FIG. 5, an original image 58, sized in this example at 512×640 pixels, is transformed from RGB space to XYZ space in step s501. Step S502 transforms to L*a*b* space, so as to yield an L*-channel color component at 59a, an a*-channel color component at 59b, and a b*-channel color component at 59c.

After conversion of the image to a perceptually uniform color space, spatial frequency content of the original image is analyzed. In the context of this embodiment of the invention, step S402 analyzes spatial frequency content by performing wavelet decomposition on each component of the converted image. That is, in a situation where step S401 converts the input image to CIEL*a*b* space, then step S402 performs wavelet decomposition on each of the L*, the a* and the b* components of the converted image.

Figure 6:
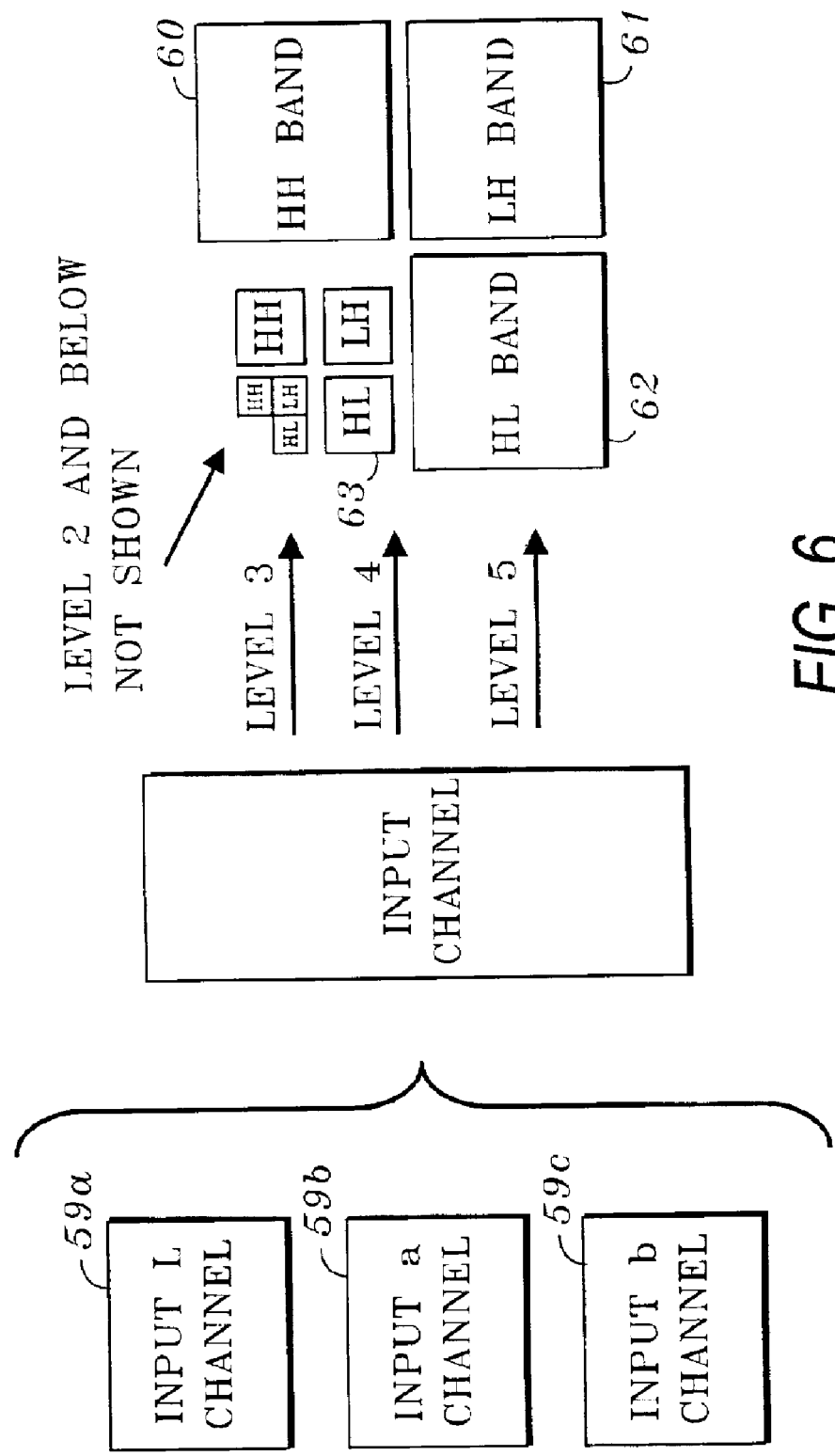
FIG. 6 is a view for explaining wavelet decomposition.

FIG. 6 shows wavelet decomposition in more detail. For each channel 59a, 59b, 59c, wavelet decomposition is performed so as to result in recursive representation of the image created by executing a sub-sampling filter on the image data. In the preferred embodiment, six levels of wavelet data are obtained, with the data taking on values between zero and 232 in accordance with image content. The six levels are level zero through level five. The decomposition of level five data consists of three of four bands that each are N/2×M/2 in size, for an original image sized N×M. As shown in FIG. 6, these three bands are L*a*b* labelled HH at reference numeral 60, LH at reference numeral 61 and HL at reference numeral 62. "H" and "L" refer to vertically high or low and horizontally high or low pass for the filter that creates these bands. In addition, a fourth LL band, indicated generally at 63, consists of all of level four through level zero data. Thus, as seen in FIG. 6, level four data consists of three of four bands that are N/4×M/4 in size and are L*a*b* labelled respectively HH, LH and HL. The LL band is further divided into level three through level zero data. Level three data is sub-divided in the same manner as levels above it; level two data and below are not shown in FIG. 6 for purposes of clarity.

Reverting to FIG. 4, steps S403 and S404 operate to construct a spatial mask which masks regions of the original image for gamut mapping by different ones of plural different gamut mapping algorithms. First, in step S403, coefficients from the wavelet decomposition performed in step S402 are rectangularized by normalizing the coefficients and then plotting the coefficients in row and column order. This is illustrated in more detail in FIGS. 7 and 8.

Figure 7:
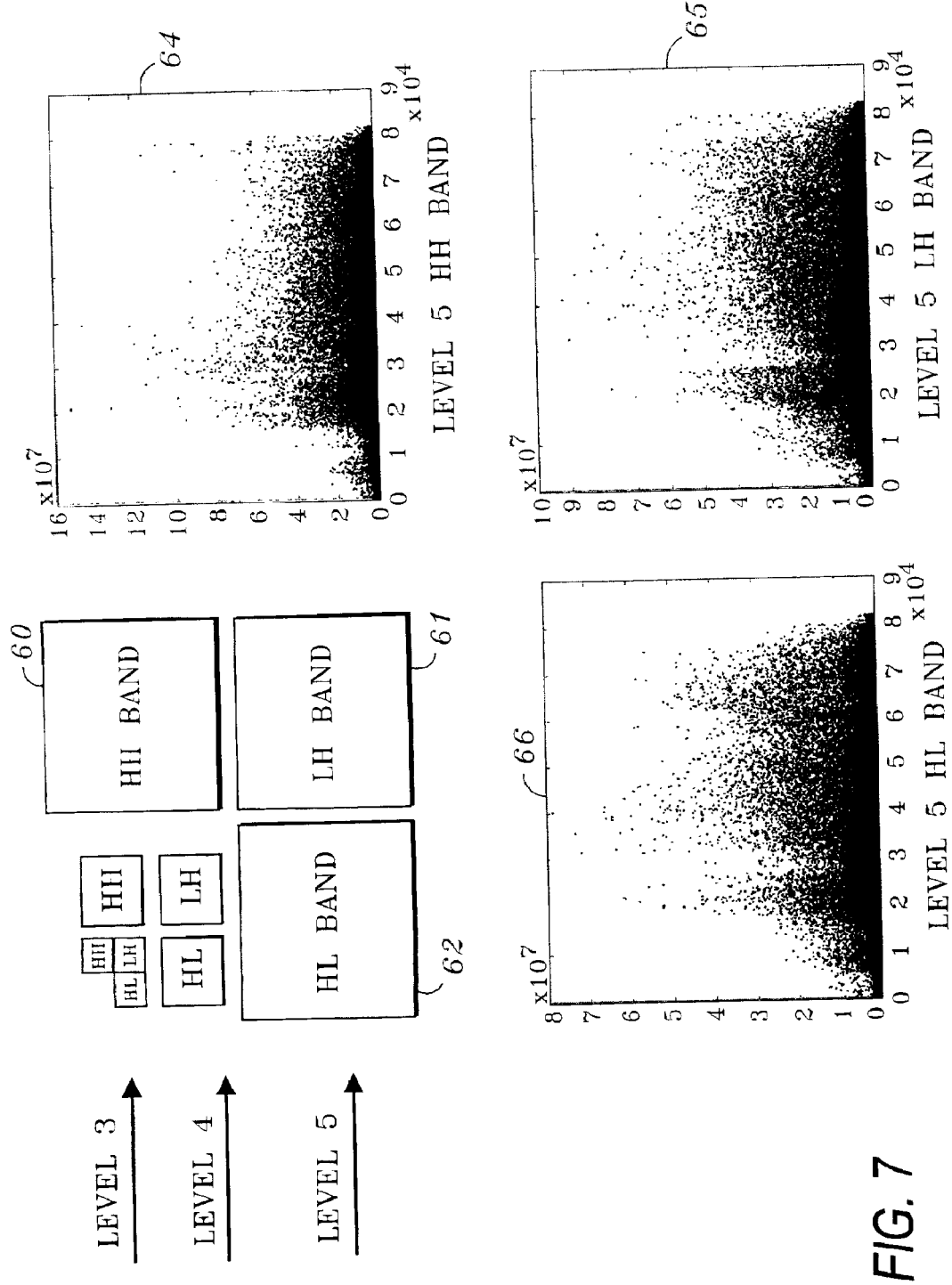
FIGS. 7 and 8 are views for explaining normalization of wavelet coefficients and rectangularization of the normalized coefficients.

Thus, as shown in FIG. 7 for a representative image, wavelet decomposition has resulted in coefficient data shown at 64 for HH band 60, at 65 for LH band 61, and at 66 for HL band 62. Each of the coefficient plots shown at 64, 65 and 66 shows coefficient value in the vertical axis as a function of coefficient number in the horizontal axis. In this example, the original image was sized at 640×512 pixels; thus, each of the HH band 60, the LH band 61 and the HL band 62 is sized at 256×320, resulting in 81,920 coefficients in each band, as shown in the plots at 64, 65 and 66. In FIG. 8, the data in each of these plots is normalized independently of the other plots, using a linear mapping that results in the minimum coefficient value being mapped to a value of zero, and the maximum coefficient value being mapped to a value of 255. Histogram analysis many be used to facilitate normalization. After normalization, the coefficient data is rectangularized by plotting the coefficients in a matrix array sized to the size of the band in question. Thus, since level five data is being considered, the coefficient data is plotted in an array sized 256×320, yielding the rectangularized coefficients shown respectively at 67, 68 and 69. Such rectangularized coefficient data is obtained for each level of data, from level zero through level 5, and for each component (that is, for the L* component, the a* component and the b* component in the case of image conversion to CIEL*a*b* space in step S401).

Reverting to FIG. 4, step S401 combines rectangularized coefficient data from the levels so as to construct an image mask. This process is shown in more detail in FIG. 9 which shows rectangularized coefficient data for the L* component in CIEL*a*b* space. FIG. 9 shows rectangularized components 67, 68 and 69 for level five HH data, HL data and LH data, respectively, as explained above in connection with FIG. 8. In addition, FIG. 9 shows rectangularized coefficient data for level five LL data 70, which as explained in connection with FIG. 6 consists of all of levels four through level zero data, each with progressively smaller image size. A spatial mask 71 is constructed from the rectangularized coefficient data. The spatial mask is the same size (M×N) as the original, which in this example means that the spatial mask is 512×640 pixels. To construct the spatial mask, one pixel from each of the level five HH, LH and HL data is extracted from corresponding pixel positions in each of the HH, LH and HL rectangularized coefficient data, and each such pixel is inserted into three of the four pixels in a small 2×2 grid 72 at a corresponding position in the spatial mask. The fourth pixel in the 2×2 grid is obtained starting from level zero data in the level five band LL data at 70, working up through each of level one through level four, so as to obtain a value for the fourth pixel in the 2×2 grid. The process is repeated for each corresponding 2×2 pixel grid in spatial mask 71.

While this embodiment obtains the fourth pixel in the 2×2 grid by working from level zero data up through level four data for the level five band LL coefficients at 70, acceptable results have been obtained with different methods for obtaining the fourth pixel. One such method involves a simple average of the normalized coefficient data from each of the HH, HL and LH bands, while ignoring all data from the LL band 70. Other methods that have been found to yield acceptable results involve combinations of methods between the two extremes of ignoring all level four through level zero data, and using all level four through level zero data.

A final spatial mask is obtained by combining the spatial masks obtained in accordance with the procedure described for FIG. 9 but for each of the L* component, the a* component and the b* component (in the case of the CIE L*a*b* space). The combination is conducted by a weighted Euclidean metric formula, as follows. Each value V in array 72 of FIG. 9 that is used to build the mask, is actually the result of the square root of the sum of the weighted squares of L*, a* and b* wavelet coefficient values (rectangularized and normalized as described before). The formula is:

$$V = [(\lambda L^*)^2 + (\alpha a^*)^2 + (\beta b^*)^2]^{(1/2)}$$

Where L*, a*, and b* are actually the level/band normalized coefficients obtained form L*, a*, and b* input data; the constants $\lambda$, $\alpha$, and $\beta$ are between 0 and 1, and their values are adjusted in dependence on image class. For an image class that includes natural photographic scenes, for example, suitable values are $\lambda=1$, $\alpha=1$, and $\beta=1$; the default value for all three constants is 1 when an image-class rule is not adopted.

Acceptable results have also been obtained by employing a spatial mask constructed solely in accordance with the L* component only, or by a spatial mask constructed from a mathematical pixel-for-pixel average of the values obtained for the L* component, the a* component and the b* component.

Reverting to FIG. 4, step S406 uses the spatial mask to associate regions of the original image with one of plural gamut mapping algorithms. In this embodiment, two gamut mapping algorithms are used; a clipping gamut mapping algorithms and a compression gamut mapping algorithms. The clipping gamut mapping algorithm is more suitable for regions of an image of low spatial frequency content, because the clipping gamut mapping algorithm preserves hue and saturation as much as possible although it loses detail. On the other hand, the compression gamut mapping algorithm is more suitable to regions of the image with higher spatial frequency content, since it tends to preserve high levels of detail, although it results in colors that appear more "washed out". Thus, in step S406, a pixel-by-pixel inspection is made of the values of the spatial mask. For those pixels of the spatial mask that exceed a predesignated threshold, indicating a low spatial frequency content, the corresponding pixel in the original image is associated with the clipping gamut mapping algorithm. On the other hand, for those pixels in the spatial mask whose value does not exceed the predesignated threshold, indicating a high spatial frequency content, corresponding pixels in the original image are associated with the compression gamut mapping algorithm. Gamut mapping is then performed on each pixel of the original image associated with a gamut mapping algorithm, using the associated gamut mapping algorithm, so as to produce a gamut mapped image of the original.

Although step S406 uses the spatial mask to select between only two gamut mapping algorithms, more than two gamut mapping algorithms are possible For example, a selection can be made from three or more gamut mapping algorithms, based on a range of values for the pixels in the spatial mask, with the gamut mapping algorithms each being tailored for a specific range of spatial frequency content.

Likewise, although the foregoing embodiment results in the association of exactly one gamut mapping algorithm for each and every pixel of the original image, step S406 can be modified to operate such that pixels in a particular spatial frequency range are not gamut mapped at all.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for gamut mapping an original image using at least one of plural different gamut mapping algorithms, said method comprising the steps of:

analyzing spatial frequency content of the original image;

associating regions of the original image with one of the plural gamut mapping algorithms based on the analysis of spatial frequency content; and gamut mapping each region associated with a gamut mapping algorithm using the associated gamut mapping algorithm so as to produce a gamut mapped image of the original image.

2. A method according to claim 1, wherein said associating step includes the step of constructing one or more spatial masks which mask regions of the original image for gamut mapping by a first gamut mapping algorithm and which mask regions of the original image for gamut mapping by a second gamut mapping algorithm.

3. A method according to claim 1, wherein said step of associating includes the step of segregating regions of the original image into busy regions and smooth regions.

4. A method according to claim 3, wherein said associating step includes the step of constructing one or more spatial masks which mask regions of the original image for gamut mapping by a first gamut mapping algorithm and which mask regions of the original image for gamut mapping by a second gamut mapping algorithm.

5. A method according to claim 4, wherein the first gamut mapping algorithm is a clipping algorithm and wherein said second gamut mapping algorithm is a compression algorithm.

6. A method according to claim 5, wherein said associating step includes the step of constructing one or more spatial masks which mask regions of the original image for gamut mapping by a first gamut mapping algorithm and which mask regions of the original image for gamut mapping by a second gamut mapping algorithm.

7. A method according to claim 3, wherein said step of gamut mapping includes gamut mapping by a first gamut mapping algorithm for smooth regions and gamut mapping by a second gamut mapping algorithm for busy regions.

8. A method according to claim 7, wherein said associating step includes the step of constructing one or more spatial masks which mask regions of the original image for gamut mapping by a first gamut mapping algorithm and which mask regions of the original image for gamut mapping by a second gamut mapping algorithm.

9. A method according to claim 1, wherein said analyzing step uses a spatial frequency analysis tool selected from the group consisting of discrete cosine transform, discrete Fourier transform, and discrete wavelet transform.

10. A method according to claim 9, wherein said associating step associates regions of the original image with one of the plural gamut mapping algorithms based on coefficients derived in said spatial frequency analysis tool.

11. A method according to claim 1, further comprising the step of transforming the original image into a perceptual color space.

12. A method according to claim 11, further comprising the step of constructing one or more spatial masks based on individual ones of the channels in the perceptual color space, and wherein said associating step associates regions of the original image with one of the plural gamut mapping algorithms based on a pre-designated threshold value in the spatial masks.

13. A method according to claim 12, wherein said analyzing step produces frequency-related coefficients, and wherein said constructing step constructs the one or more spatial masks based on normalized values of the coefficients.

14. A method according to claim 11, further comprising the step of constructing one or more spatial masks based on individual ones of the channels in the viewing condition independent color space, and wherein said associating step associates regions of the original image with one of the plural gamut mapping algorithms based on a pre-designated threshold value in the spatial masks.

15. A method according to claim 14, wherein said analyzing step produces frequency-related coefficients, and wherein said constructing step constructs the one or more spatial masks based on normalized values of the coefficients.

16. A method according to claim 1, further comprising the step of transforming the original image into a viewing condition independent color space.

17. An apparatus for gamut mapping an original image using at least one of plural different gamut mapping algorithms, comprising:

a program memory storing process steps executable to perform a method according to any of claims 1 to 15.

18. Computer-executable process steps stored on a computer readable medium, said computer executable process steps for gamut mapping an original image using at least one of plural different gamut mapping algorithms, said computer-executable process steps executable to perform a method according to any of claims 1 to 15.

19. A computer-readable medium which stores computer-executable process steps, the computer executable process steps for gamut mapping an original image using at least one of plural different gamut mapping algorithms, said computer-executable process steps executable to perform a method according to any of claims 1 to 15.

20. A color management module comprising:

a first transformation sequence that transforms color image data to a profile connector space;

a gamut mapping module that maps colors in the color image data to colors reproducible by a color output device, so as to obtain gamut-mapped image data; and a second transformation sequence that transforms the gamut-mapped image data to a device dependent color space for the color output device;

wherein said gamut mapping module gamut-maps in accordance with the method of any of claims 1 to 15.

21. A color management module according to claim 20, wherein the color management module is comprised of a color print driver.

22. A color management module according to claim 20, wherein the color management module is comprised of a stand-alone application program.

23. A color management module according to claim 20, wherein the color management module is comprised of a dynamic link library.

24. A method for gamut mapping an original image using at lest one of plural different gamut mapping processes, said method comprising the steps of:

providing plural different gamut mapping processes;

performing gamut mapping on the original image by using the plural different gamut mapping processes;

obtaining spatial frequency content of the original image; and controlling the gamut mapping based on the spatial frequency content.

25. The method according to claim 24, wherein the plural different gamut mapping processes include a gamut mapping process using a clipping algorithm and a gamut mapping process using a compression algorithm.

26. A computer-readable medium which stores computer-executable process steps, the computer executable process steps for gamut mapping an original image using at lest one of plural different gamut mapping processes, said computer-executable process steps including:

providing plural different gamut mapping processes;

performing gamut mapping on the original image by using the plural different gamut mapping processes;

obtaining spatial frequency content of the original image; and controlling the gamut mapping based on the spatial frequency content.

* * * * *

UNITED STATES PATENT AND TRADEMARK OFFICE
CERTIFICATE OF CORRECTION

PATENT NO. : 6,961,477 B2
APPLICATION NO. : 09/902593
DATED : November 1, 2005
INVENTOR(S) : Eugenio Martinez-Uriegas et al.

It is certified that error appears in the above-identified patent and that said Letters Patent is hereby corrected as shown below:

COLUMN 8
       Line 48, "claims 1 to 15" should read --claims 1 to 16--;
       Line 55, "claims 1 to 15" should read --claims 1 to 16--; and
       Line 61, "claims 1 to 15" should read --claims 1 to 16--.

Column 9
       Line 5, "claims 1 to 15" should read --claims 1 to 16--.

Signed and Sealed this

Fifth Day of September, 2006

JON W. DUDAS
*Director of the United States Patent and Trademark Office*